United States Patent
Machida et al.

(10) Patent No.: US 9,864,110 B2
(45) Date of Patent: Jan. 9, 2018

(54) LIGHT DIFFUSER AND USE THEREOF

(71) Applicant: Sekisui Plastics Co., Ltd., Osaka-shi (JP)

(72) Inventors: Kazuki Machida, Koka (JP); Fumitaka Ishimori, Koka (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 0 days.

(21) Appl. No.: 15/300,447

(22) PCT Filed: Sep. 30, 2014

(86) PCT No.: PCT/JP2014/076155
§ 371 (c)(1),
(2) Date: Sep. 29, 2016

(87) PCT Pub. No.: WO2015/151319
PCT Pub. Date: Oct. 8, 2015

(65) Prior Publication Data
US 2017/0115434 A1    Apr. 27, 2017

(30) Foreign Application Priority Data

Mar. 31, 2014   (JP) .................. 2014-071922

(51) Int. Cl.
*G02B 5/02*       (2006.01)
*F21V 3/04*       (2006.01)
*G03B 21/62*      (2014.01)

(52) U.S. Cl.
CPC .......... *G02B 5/0278* (2013.01); *F21V 3/0445* (2013.01); *G02B 5/0242* (2013.01); *G03B 21/62* (2013.01)

(58) Field of Classification Search
CPC ..... G03B 21/62; G02B 5/0278; G02B 5/0242
(Continued)

(56) References Cited

U.S. PATENT DOCUMENTS 3,609,000 A  *  9/1971  Miyano .................. G03B 21/62
                                              359/453
6,621,635 B1     9/2003  Yano
(Continued)

FOREIGN PATENT DOCUMENTS

JP       09-306217 A      11/1997
JP     2000-347007 A      12/2000
(Continued)

OTHER PUBLICATIONS

International Search Report dated Jan. 13, 2015, issued for PCT/JP2014/076155.

*Primary Examiner* — Christopher Mahoney
(74) *Attorney, Agent, or Firm* — Wenderoth, Lind & Ponack, L.L.P.

(57) ABSTRACT

A light diffuser and its use are provided, which not only reduces a color change in a source light when the light diffuser is disposed on an optical path of a light source, but also has a good light transmission property and a good light diffusion property. The light diffuser contains a thermoplastic resin and transparent particles added thereto. The total light transmittance of the light diffuser is 75% or more. The degree of dispersion of the light diffuser is 2° or more, the degree of dispersion being defined as a transmission angle at which a light transmittance is 50% of a rectilinear light transmittance when light is emitted to a surface of the light diffuser in a direction normal to the surface. The difference between the rectilinear light transmittance at 460 nm and the rectilinear light transmittance at 580 nm of the light diffuser is 0.96% or less.

7 Claims, 1 Drawing Sheet

(58) Field of Classification Search
USPC .................................................. 359/452–453
See application file for complete search history.

(56) References Cited

U.S. PATENT DOCUMENTS

| | | |
|---|---|---|
| 2001/0002153 A1 | 5/2001 | Yano |
| 2004/0047056 A1 | 3/2004 | Sekiguchi et al. |
| 2005/0068619 A1 | 3/2005 | Osawa |
| 2005/0141086 A1* | 6/2005 | Maruta .................. G03B 21/60 |
| | | 359/449 |
| 2008/0158670 A1* | 7/2008 | Parusel ................ G02B 5/0226 |
| | | 359/453 |
| 2009/0040618 A1 | 2/2009 | Iyama |
| 2012/0019140 A1* | 1/2012 | Maxik .................. A61N 5/0618 |
| | | 315/50 |

FOREIGN PATENT DOCUMENTS

| | | |
|---|---|---|
| JP | 2005-099479 A | 4/2005 |
| JP | 2005-284237 A | 10/2005 |
| JP | 2008-064951 A | 3/2008 |
| JP | 2010-156930 A | 7/2010 |
| WO | 2010/113741 A1 | 10/2010 |

* cited by examiner

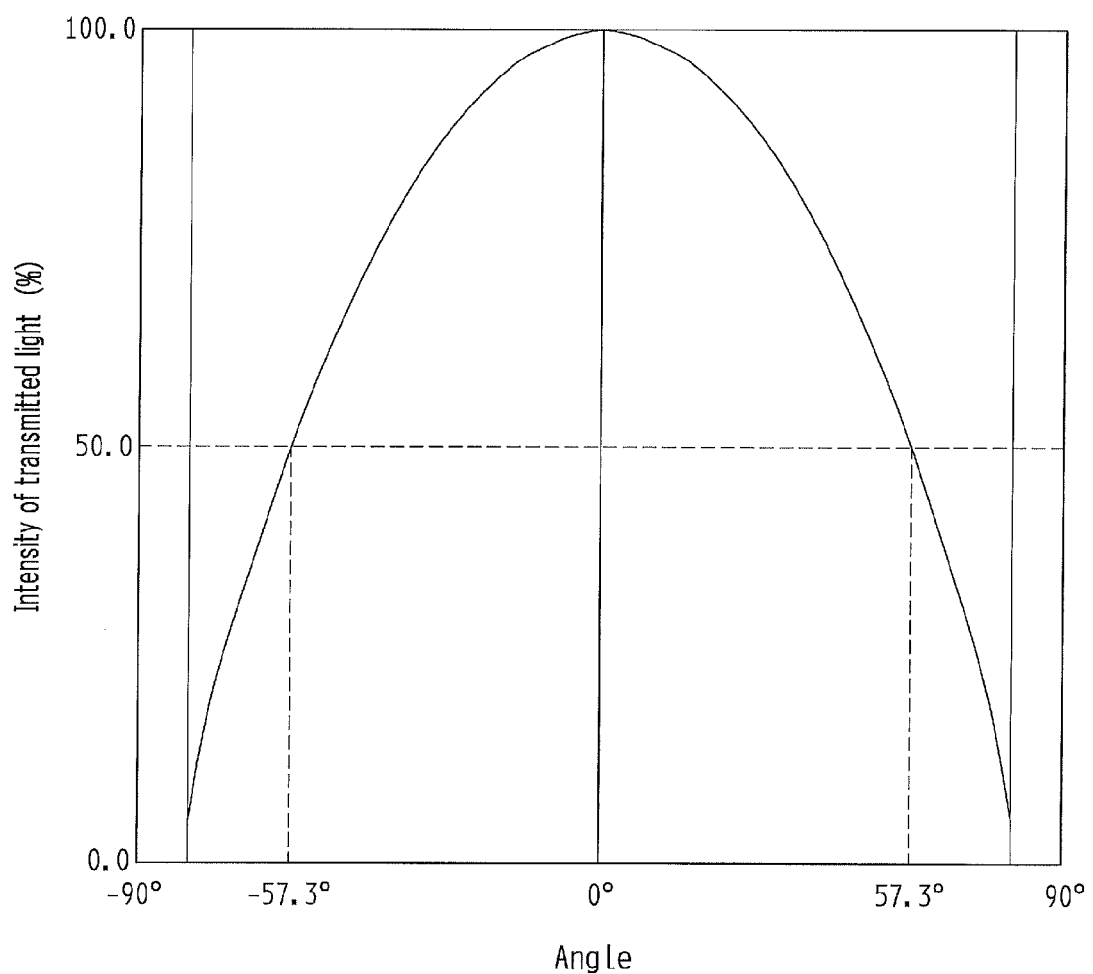

LIGHT DIFFUSER AND USE THEREOF

TECHNICAL FIELD

The present invention relates to a light diffuser such as a light diffuser for LED (light emitting diode) light sources and a light diffuser for a fluorescent lamp, and use of the light diffuser (as a lighting cover, an image projection screen, and a semi-transparent building material).

BACKGROUND ART

Conventionally, a light diffuser in which transparent particles are added to a thermoplastic resin has been known in the art.

However, when a common conventional light diffuser is disposed on an optical path of a light source, the light diffuser changes the color of a source light (the light emitted from the light source and reaching the eye or an illuminated object) and degrades color reproducibility of the source light. For example, if a common conventional light diffuser serving as a lighting cover is disposed on an optical path of a light source of a lighting apparatus, the light diffuser degrades color reproducibility, i.e. color rendering property, of the lighting apparatus.

PTL 1 discloses a light diffusion plate for a white fluorescent lamp cover. In order to keep the color tone of a white fluorescent lamp without a significant change when the light diffusion plate is employed as a covering material for a white fluorescent lamp of any color tone, the light diffusion plate disclosed in PTL 1 has a total light transmittance of 40% or more, with an absolute value of a difference between light transmittances at wavelengths of 436 nm and 544 nm being 5% or less, and an absolute value of a difference between light transmittances at wavelengths of 544 nm and 612 nm being 5% or less.

CITATION LIST

Patent Literature

[PTL 1] JP 9-306217 A

SUMMARY OF THE INVENTION

Technical Problem

However, the light diffuser disclosed in PTL 1 is inferior in either light transmission property or light diffusion property. For example, the light diffusion plates in Examples 1 to 6, 8 and 9 of PTL 1 have a total light transmittance of 70% or less, and hence a poor light transmission property. Further, in the light diffusion plate in Example 7 of PTL 1, the refractive index of the transparent base material and the refractive index of the light-diffusing dispersion material (particles) are both 1.49. As a result, the light diffusion plate in Example 7 does not substantially diffuse light at the surface of the light-diffusing dispersion material (particles) and hence has substantially no light diffusion property.

The present invention is made in view of the above-mentioned conventional problems, and aims to provide a light diffuser, a lighting cover, an image projection screen, and a semi-transparent building material, each of which reduces a color change in a source light when the light diffuser is disposed on an optical path of a light source, and each of which exhibits both a light diffusion property and a good light transmission property.

Solution to Problem

In order to solve the above-mentioned problems, a light diffuser according to the present invention which contains a thermoplastic resin and transparent particles added thereto includes following features. A total light transmittance of the light diffuser is 75% or more. A degree of dispersion of the light diffuser is 2° or more, wherein the degree of dispersion is defined as a transmission angle at which a light transmittance is 50% of a rectilinear light transmittance when light is emitted to a surface of the light diffuser in a direction normal to the surface (hereinafter abbreviated as "degree of dispersion (D50)"). A difference between a rectilinear light transmittance at a wavelength of 460 nm and a rectilinear light transmittance at a wavelength of 580 nm of the light diffuser is 0.96% or less.

Since the degree of dispersion (D50) is 2° or more, the light diffuser having the above configuration has a light diffusion property. Since the total light transmittance is 75% or more, the light diffuser having the above configuration has a good light transmission property. Since the difference between the rectilinear light transmittance at a wavelength of 460 nm (i.e. a wavelength of blue light) and the rectilinear light transmittance at a wavelength of 580 nm (i.e. a wavelength of orange light) of the light diffuser is 0.96% or less, the light diffuser having the above configuration reduces a color change (particularly into blue or orange) in a source light when the light diffuser is disposed on an optical path of a light source which contains both a 460-nm light and a 580-nm light.

A lighting cover according to the present invention is a molded product of the light diffuser of the present invention.

Since the lighting cover having the above configuration is a molded product of the light diffuser of the present invention which has a good light diffusion property, the lighting cover can make the shape of the light source sufficiently less noticeable, can reduce the intensity of the rectilinear light adequately, and can reduce glare adequately. Since the lighting cover having the above configuration is a molded product of the light diffuser of the present invention which has a good light transmission property, the lighting cover can provide a luminaire with a desirable brightness (luminous flux). Since the lighting cover having the above configuration is a molded product of the light diffuser of the present invention which reduces a color change in a source light when the light diffuser is disposed on an optical path of a light source, the lighting cover can reduce a color change in a source light caused by the presence of the lighting cover, and can be suitably used as a lighting cover for a lighting apparatus for color evaluation.

An image projection screen according to the present invention is a molded product of the light diffuser of the present invention.

Since the image projection screen according to the present invention is a molded product of the light diffuser of the present invention having a good light diffusion property and a good light transmission property, the image projection screen can advantageously diffuse-transmit and diffuse-reflect the incident light, and can serve suitably as both a rear projection screen and a front projection screen. Since the image projection screen having the above configuration is a molded product of the light diffuser of the present invention which reduces a color change in a source light when the light diffuser is disposed on an optical path of a light source, the image projection screen can improve color reproducibility of a projected image.

A semi-transparent building material according to the present invention is a molded product of the light diffuser of the present invention.

Since the semi-transparent building material according to the present invention is a molded product of the light diffuser of the present invention which has a good light diffusion property and a good light transmission property, and which reduces a color change in a source light when the light diffuser is disposed on an optical path of a light source, the semi-transparent building material can be suitably used in various applications.

Advantageous Effects of Invention

The present invention can provide a light diffuser, a lighting cover, an image projection screen, and a semi-transparent building material, each of which reduces a color change in a source light when the light diffuser is disposed on an optical path of a light source, and each of which exhibits both a light diffusion property and a good light transmission property.

BRIEF DESCRIPTION OF DRAWINGS

FIG. 1 is a graph which represents an intensity of light transmitted through a light diffusion plate (a light diffuser), measured by an automatic goniophotometer.

DESCRIPTION OF EMBODIMENTS

The present invention is hereinafter described in detail.

A light diffuser of the present invention contains a thermoplastic resin and transparent particles added thereto. The total light transmittance of the light diffuser is 75% or more. The degree of dispersion (D50) of the light diffuser is 2° or more. The difference between the rectilinear light transmittance at a wavelength of 460 nm and the rectilinear light transmittance at a wavelength of 580 nm of the light diffuser is 0.96% or less.

For this light diffuser, a satisfactory difference between the rectilinear light transmittance at a wavelength of 460 nm and the rectilinear light transmittance at a wavelength of 580 nm of the light diffuser is 0.96% or less, and more preferably 0.95% or less. A light diffuser which satisfies this requirement can further reduce a color change in a source light when the light diffuser is disposed on an optical path of a light source.

For this light diffuser, a satisfactory degree of dispersion (D50) is 2° or more, and more preferably 5° or more. A light diffuser which satisfies this requirement can ensure an even better light diffusion property.

For this light diffuser, a satisfactory total light transmittance is 75% or more, more preferably 80% or more, further preferably 85% or more, and most preferably 90% or more. The light diffuser which satisfies this requirement allows a greater amount of light emitted from the light source to pass through the light diffuser. Thus, the light diffuser can further prevent a decrease in brightness of a source light when the light diffuser is disposed on an optical path of the light source. Therefore, this light diffuser can be utilized to provide a device or apparatus which is equipped with a light source (such as a lighting apparatus or a display) and which is capable of emitting a brighter source light.

Although the shape and thickness of the light diffuser are not particularly limited as far as the light diffuser can exhibit the optical effects of the present invention, a light diffusion plate (a plate-like light diffuser) having a thickness in the range of 0.5 to 3 mm is preferable. In the case where the light diffuser is a plate-shaped light diffusion cover (a type of light diffusion plate) for an LED luminaire to be used for an LED light bulb, a double-capped LED or other like LED luminaires, the thickness (the plate thickness) of the plate-shaped light diffusion cover for an LED luminaire is more preferably in the range of 1 to 2 mm, in consideration of the demand for lightweight LED light bulbs and double-capped LEDs.

The size and shape of the light diffusion cover for an LED luminaire are not particularly limited and may be designed, for example, to match the size and shape of a light emitting part (a part of an LED luminaire excluding the light diffusion cover) of an LED luminaire such as an LED light bulb, a double-capped LED luminaire, an LED desk light, and an LED ceiling light.

<Transparent Particles>

The transparent particles simply need to be light transmissive. The transparent particles may be particles having a uniform refractive index (for example, particles of a single material, or core-shell particles each containing a core and a shell having the same refractive index), or may be particles containing a plurality of portions having different refractive indexes (for example, core-shell particles each containing a core and a shell having different refractive indexes).

Preferably, the number average particle size of the transparent particles is between 1 and 20 μm. Provided that the content of particles whose particle size is 0.9 to 1.1 times the number average particle size is divided by two, the result being taken as a first value, and that the content of particles whose particle size is 0.8 to 1.2 times the number average particle size is divided by four, the result being taken as a second value, the absolute value of the difference between the first value and the second value is preferably 1.0% by number or less. It should be noted that the wavelength region in which the rectilinear light transmittance (regular transmittance) of the transparent particles is low is variable depending on the particle size of the transparent particles. Hence, if the particle size of the transparent particles is uniform, transmission of light through the transparent particles is likely to be more wavelength-dependent, so that the light diffuser tends to cause a greater color change in a source light when the light diffuser is disposed on an optical path of a light source. On the other hand, in the above preferable case, provided that the content of particles whose particle size is 0.9 to 1.1 times the number average particle size is divided by two, the result being taken as a first value, and that the content of particles whose particle size is 0.8 to 1.2 times the number average particle size is divided by four, the result being taken as a second value, the absolute value of the difference between the first value and the second value is 1.0% by number or less. Hence, in the range where the particle size is 0.8 to 1.2 times the number average particle size of 1 to 20 μm, the frequency distribution is relatively uniform (the number-based particle size distribution is generally trapezoid). In this context, the transparent particles can be divided into some particle groups each having a different particle size from the others, so that the wavelength region in which the rectilinear light transmittance is low is different from group to group (in the present case, for example, the transparent particles are divided into four particle groups: a particle group whose particle size is 0.8 (inclusive) to 0.9 (exclusive) times the number average particle size; a particle group whose particle size is 0.9 (inclusive) to 1.0 (exclusive) times the number average particle size; a particle group whose particle size is 1.0 (inclusive) to 1.1 (inclusive) times the number average particle size; and a particle group whose particle size is 1.1 (exclusive) to 1.2 (inclusive) times the number average particle size.). According to the above requirement, the numbers of particles in these particle groups are close to each other. As a result, these particle groups can compensate for their wavelength dependency in transmission of light among themselves, so that the light diffuser can further reduce a color change in a source light when the light diffuser is disposed on an optical path of a light source.

In the above preferable case, the number average particle size is more preferably between 2 and 20 μm, yet more preferably between 3 and 20 μm, and most preferably between 3 and 15 μm. A light diffuser which satisfies this requirement can further reduce a color change in a source light when the light diffuser is disposed on an optical path of a light source.

If the transparent particles have a uniform refractive index, the number average particle size of the transparent particles is more preferably in the range of 2 to 15 μm, even more preferably in the range of 3 to 10 μm, and most preferably between 3 and 7 μm. A light diffuser which satisfies this requirement can further reduce a color change in a source light when the light diffuser is disposed on an optical path of a light source.

If the transparent particles are core-shell particles each containing a core and a shell having different refractive indexes and if the refractive index of the shell is nearly equal to that of the thermoplastic resin, the number average particle size of the core is more preferably in the range of 2 to 15 μm, even more preferably in the range of 3 to 10 μm, and most preferably between 3 and 7 μm. A light diffuser which satisfies this requirement can further reduce a color change in a source light when the light diffuser is disposed on an optical path of a light source.

Regarding the number distribution of the transparent particles in the above preferable case, provided that the content of particles whose particle size is 0.9 to 1.1 times the number average particle size is divided by two, the result being taken as a first value, and that the content of particles whose particle size is 0.8 to 1.2 times the number average particle size is divided by four, the result being taken as a second value, the absolute value of the difference between the first value and the second value is more preferably 0.8% by number or less. A light diffuser which satisfies this requirement can further reduce a color change in a source light when the light diffuser is disposed on an optical path of a light diffuser.

The volume average particle size of the transparent particles is preferably between 1 and 20 μm, more preferably between 2 and 20 μm, even more preferably between 2 and 15 μm, and most preferably between 3 and 15 μm. A light diffuser which satisfies this requirement can have a still higher total light transmittance.

If the transparent particles have a uniform refractive index, the volume average particle size of the transparent particles is preferably in the range of 1 to 20 μm, more preferably in the range of 2 to 15 μm, further preferably in the range of 2 to 12 μm, and most preferably between 3 and 12 μm. By controlling the volume average particle size of the transparent particles within such ranges, a light diffuser can have a still higher total light transmittance and an even better light diffusion property.

If the transparent particles are core-shell particles each containing a core and a shell having different refractive indexes and if the refractive index of the shell is nearly equal to that of the thermoplastic resin, the volume average particle size of the core is preferably in the range of 1 to 20 μm, more preferably between 2 and 15 μm, and most preferably between 3 and 15 μm. By controlling the volume average particle size of the core within such ranges, a light diffuser can have a still higher total light transmittance and an even better light diffusion property.

Preferably, the coefficient of variation in particle size of the transparent particles is in the range of 20 to 40%. If the coefficient of variation in particle size of the transparent particles is less than 20%, transmission of light through the transparent particles is likely to be more wavelength-dependent, so that the light diffuser tends to cause a greater color change in a source light when the light diffuser is disposed on an optical path of a light source. On the other hand, if the coefficient of variation in particle size of the transparent particles exceeds 40%, the number of less light-transmissive microparticles and/or the number of less light-diffusive coarse particles will be greater. The resulting light diffuser may have a poorer light transmission property and a poorer light diffusion property, in comparison with the light diffuser in which the coefficient of variation in particle size of the transparent particles is 40% or less.

Materials of the transparent particles (materials constituting the transparent particles) include, for example: synthetic resins such as crosslinked (meth)acrylic-based resins, crosslinked styrene-based resins, polyurethane-based resins, polyester-based resins, silicone-based resins, fluorine-based resins, and copolymers thereof; inorganic substances such as silica, calcium carbonate, and barium sulfate; and the like. Among them, preferable materials are synthetic resins, of which crosslinked (meth)acrylic-based resins, crosslinked styrene-based resins, copolymers thereof (crosslinked (meth)acrylic-styrene copolymer), and silicone-based resins are more preferable, and of which crosslinked (meth)acrylic-based resins, crosslinked styrene-based resins, and copolymers thereof are most preferable. When the thermoplastic resin is polycarbonate, crosslinked (meth)acrylic-based resins are most preferable. The transparent particles may be used alone or in combination. In this specification, the term "(meth)acrylic" means methacrylic or acrylic.

In the case where the transparent particles contain a polymer of a vinyl-based monomer (a compound having at least one ethylenic unsaturated group) containing a crosslinkable monomer (a compound having two or more ethylenic unsaturated groups) such as a crosslinked (meth)acrylic-based resin, a crosslinked styrene-based resin, and a copolymer thereof, this polymer contains a structural unit deriving from the crosslinkable monomer preferably in an amount of 1 to 50% by weight, and more preferably in an amount of 5 to 30% by weight. If such range(s) is/are satisfied, a high-level three-dimensional network can be formed in the transparent particles, and it is eventually possible to provide a light diffuser having a superior light diffusion property.

The crosslinkable monomers include, for example, (meth)acrylate-based polyfunctional monomers such as allyl methacrylate, ethylene glycol di(meth)acrylate, diethylene glycol di(meth)acrylate, triethylene glycol di(meth)acrylate, nonaethylene glycol di(meth)acrylate, tetradecaethylene glycol di(meth)acrylate, decaethylene glycol di(meth)acrylate, pentadecaethylene glycol di(meth)acrylate, 1,3-butylene glycol di(meth)acrylate, 1,4-butanediol di(meth)acrylate, 1,6-hexanediol di(meth)acrylate, glycerin di(meth)acrylate, trimethylolpropane tri(meth)acrylate, pentaerythritol tetra (meth)acrylate, phthalate diethylene glycol di(meth)acrylate, caprolactone-modified dipentaerythritol hexa(meth) acrylate, caprolactone-modified neopentylglycol hydroxypivalate diacrylate, polyester acrylate, and urethane acrylate; and aromatic vinyl-based polyfunctional monomers such as divinyl benzene, divinyl naphthalene, and derivatives thereof. These crosslinkable monomers may be used in combination. In this specification, the term "(meth) acrylate" means methacrylate or acrylate.

The crosslinked (meth)acrylic-based resin contains a monofunctional (meth)acrylic-based monomer. The monofunctional (meth)acrylic-based monomer is not particularly limited as far as being a compound having an acryloyloxy group or a methacryloyloxy group. Examples of the monofunctional (meth)acrylic-based monomer are acrylic acid, methyl acrylate, ethyl acrylate, n-butyl acrylate, isobutyl acrylate, dodecyl acrylate, stearyl acrylate, 2-ethylhexyl acrylate, tetrahydrofurfuryl acrylate, methacrylic acid, methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, and stearyl methacrylate. These monofunctional (meth)acrylic-based monomers may be used alone or in combination.

The styrene-based resin contains a monofunctional styrene-based monomer. The monofunctional styrene-based monomer is not particularly limited as far as being a styrene having an ethylenic unsaturated group. Examples of the styrene-based resin are styrene, o-methylstyrene, m-methylstyrene, p-methylstyrene, and α-methylstyrene. These monofunctional styrene-based monomers may be used alone or in combination. The copolymer of the crosslinked (meth) acrylic-based resin and the crosslinked styrene-based resin contains the above-mentioned monofunctional (meth) acrylic-based monomer and the above-mentioned monofunctional styrene-based monomer.

The refractive index of the transparent particles only needs to be different from the refractive index of the thermoplastic resin. The difference between the refractive index of the transparent particles and that of the thermoplastic resin is preferably in the range of 0.01 to 0.2, and more preferably in the range of 0.02 to 0.1.

The shape of the resin particles is not particularly limited, but a spherical shape is preferable.

The resin particles may be dispersed evenly in the thermoplastic resin in the entire light diffuser, or may be provided as a resin particle layer(s) on a light incident surface side and/or a light output surface side of the thermoplastic resin.

The amount of the transparent particles in the light diffuser is not particularly limited as far as the light diffuser can exhibit the optical effects of the present invention. Preferably, the amount of the transparent particles is in the range of 0.5 to 2.0% by weight, and more preferably in the range of 0.5 to 1.5% by weight. By setting the amount of the transparent particles to 0.5% by weight or more, the light diffuser can have a still higher light diffusion property. On the other hand, by setting the amount of the transparent particles to 2.0% by weight or less, the light diffuser can have a still higher total light transmittance.

<Thermoplastic Resin>

The thermoplastic resin is not particularly limited as far as it is transparent enough to provide a light diffuser having a total light transmittance of 75% or more. Examples of the thermoplastic resin are polycarbonate resins; cellulose derivatives such as acetylcellulose, nitrocellulose, cellulose acetate butyrate, ethylcellulose, and methylcellulose; a homopolymer or copolymer of vinyl acetate, a homopolymer or copolymer of vinyl chloride, a homopolymer or copolymer of vinylidene chloride; acetal resins such as polyvinyl formal and polyvinyl butyral; (meth)acrylic-based resins such as acrylic resins (polyacrylic acid esters) and copolymer resins thereof, and methacrylic resins (polymethacrylic acid esters) and copolymer resins thereof; acrylonitrile-butadiene-styrene copolymer resin (ABS resin); polystyrene resins; polyamide resins; and linear polyester resins.

The light diffuser of the present invention can be utilized as a light diffuser for a light source which includes light having a wavelength of 460 nm as well as light having a wavelength of 580 nm (for example, a light diffuser for an LED light source, a light diffuser for a fluorescent lamp) or a light diffuser for like use. Considering the fact that the LED light source generally emits light with a high proportion of 460-nm light and 580-nm light, the light diffuser of the present invention is suitable as a light diffuser for an LED light source, such as a light diffusion cover for an LED luminaire and a light diffusion sheet for a display. When used for an LED luminaire having an LED light source (for example, for an LED light bulb or a light bulb-type LED luminaire, a double-capped LED luminaire, an LED desk light or an LED desk lamp, an LED ceiling light, etc.), the light diffusion cover for an LED luminaire surrounds the LED light source and diffuses light from the LED light source. When used for a display using an LED light source (for example, for a liquid crystal display using an LED light source), the light diffusion sheet for a display is overlaid on an LED light source and diffuses light from the LED light source.

<Lighting Cover>

The light diffuser of the present invention can be used as a lighting cover for covering a light source in a luminaire using a variety of light sources such as a fluorescent lamp, a light emitting diode (LED), and the like. The lighting cover of the present invention is a molded product of the light diffuser of the present invention. The shape of the light diffuser of the present invention is not particularly limited, and may be designed variously depending on its intended use. For example, when the light diffuser of the present invention is used as a lighting cover, the shape of the light diffuser may be semicylindrical, cylindrical, flat plate-shaped, dome-shaped (semispherical), pear-shaped, candle flame-like, or other like shapes.

Regarding the light source for a luminaire to be employed with the lighting cover of the present invention, the intensity of light is not particularly limited. Use may be made of a wide range of light sources, from a low-intensity light source such as a car interior light on an interior panel of a car, to a high-intensity light source such as a mercury lamp and an LED lamp alternative to a mercury lamp.

Since the transmittances in the light diffuser of the present invention are almost identical at various wavelengths, the lighting cover of the present invention is suitable as a lighting cover for a lighting apparatus for color evaluation. Namely, the lighting cover of the present invention is applicable to a lighting apparatus for color evaluation which uses a light source for color evaluation, and suitably serves as a lighting cover for covering the light source.

The lighting apparatus for color evaluation illuminates an object to be evaluated (e.g. printed matter) in a color evaluation process. Although the light source for color evaluation is not particularly limited, a preferable light source has a higher general color rendering index (Ra) and is closer to the natural light. To be specific, Ra of the light source for color evaluation is preferably 90 or higher, more preferably 95 or higher, and even more preferably 97 or higher. It is further preferable for the light source for color evaluation to have a higher special color rendering index (Ri (i=9 to 15)). To be specific, Ri (i=9 to 15) of the light source for color evaluation is preferably 70 or higher, more preferably 75 or higher, and even more preferably 80 or higher. It is also preferable for the lighting apparatus for color evaluation to have a color temperature of 5,000K.

<Image Projection Screen>

An image projection screen according to the present invention is a molded product of the light diffuser of the present invention. The image projection screen of the present invention ensures a high color reproducibility for a source light, irrespective of the thickness of the image projection screen. Therefore, it is possible to provide a homogeneous image projection screen with a good color reproducibility, irrespective of the viewing angle. The image projection screen of the present invention can be employed suitably as both a rear projection screen and a front projection screen.

<Semi-Transparent Building Materials>

A semi-transparent building material according to the present invention is a molded product of the light diffuser of the present invention. The semi-transparent building material of the present invention has a good light transmission property, and its scatter reflectivity and transmission visibility do not change with wavelengths. Therefore, the semi-transparent building material can be suitably used for various applications. Specifically, the semi-transparent building material of the present invention which employs the light diffuser of the present invention is replaceable for a conventional semi-transparent base material such as a frosted glass plate or a conventional semi-transparent resin plate, and can be used for various applications, for example, to a semi-transparent window, a semi-transparent partition, etc.

<Other Applications>

Owing to the high light transmission property and the high color reproducibility, the light diffuser according to the present invention may be also used as a light diffusing base material (substrate) for an optical film or a liquid crystal display on which video contents are projected.

EXAMPLES

Hereinafter, the present invention is described by way of Examples and Comparative Examples, which should not be construed as limiting the present invention.

In following Examples and Comparative Examples, various characteristics of the transparent particles were measured and judged, in terms of volume average particle size, coefficient of variation in particle size, number average particle size, content of particles whose particle size was 0.9 to 1.1 times the number average particle size, content of particles whose particle size was 0.8 to 1.2 times the number average particle size, and whether the number-based particle size distribution was substantially trapezoid. The measurement/judgment methods are described below.

<Method for Measuring the Volume Average Particle Size of the Transparent Particles>

To obtain the volume average particle size of the transparent particles, an aperture with a diameter of 20 to 400 µm was filled with an electrolyte solution. While the transparent particles were passing through the electrolyte solution, the change in conductivity of the electrolyte solution was measured to obtain the volume of the transparent particles. The thus obtained volume was used for calculation of the volume average particle size. Specifically, the volume average particle size of the transparent particles was a volume average particle size (an arithmetic average size in a volume-based particle size distribution) measured with use of "Multisizer III" (manufactured by Beckman Coulter, Inc.) which is an accurate particle size distribution analyzer utilizing Coulter principle. For this measurement, "Multisizer III" was calibrated with use of an aperture matching the particle size of particles to be measured, according to "REFERENCE MANUAL FOR THE COULTER MULTISIZER" (1987) published by Coulter Electronics Limited.

Specifically, 0.1 gram of transparent particles was ultrasonically dispersed in 10 ml of 0.1%-by-weight non-ionic surfactant solution by means of a touch mixer to give a dispersion. In a beaker (an attachment to the main body of "Multisizer III") filled with "ISOTON® II" (an electrolyte solution for measurement, manufactured by Beckman Coulter, Inc.), the dispersion was added dropwise by a dropper, with gentle stirring, until the reading of the concentration meter on the main body display of "Multisizer III" reached around 10%. Next, Aperture size (diameter), Current (aperture current), Gain (gain), Polarity (polarity of inner electrode) were inputted on the main body of "Multisizer III", according to "REFERENCE MANUAL FOR THE COULTER MULTISIZER" (1987) published by Coulter Electronics Limited. Then, the volume-based particle size distribution was measured by Manual (manual operating mode). During the measurement, stirring was applied in the beaker so gently as not to include air bubbles. The measurement was ended when 100,000 transparent particles were measured for particle size distribution. In this context, the volume average particle size of the transparent particles is an average particle size of the 100,000 transparent particles subjected to the measurement, and means an arithmetic average particle size in the volume-based particle size distribution.

<Method for Calculating the Coefficient of Variation in the Particle Size of the Transparent Particles>

The coefficient of variation in the particle size of the transparent particles (hereinafter called "CV") was calculated by the following formula, wherein σ is a standard deviation and x is a volume average particle size, as obtained in the above-mentioned measurement of the volume-based particle size distribution.

$$\text{coefficient of variation (\%)} = (\sigma/x) \times 100$$

<Method for Measuring the Number Average Particle Size of the Transparent Particles>

The number-based particle size distribution of the transparent particles was measured in the same manner as the measurement of the volume-based particle size distribution in "Method for measuring the volume average particle size of the transparent particles" described above. The arithmetic average of the number-based particle size distribution was taken as the number average particle size.

<Method for Measuring the Content of Particles Whose Particle Size was 0.9 to 1.1 Times the Number Average Particle Size, and the Content of Particles whose Particle Size was 0.8 to 1.2 Times the Number Average Particle Size>

Based on the number-based particle size distribution (particle size distribution) of the transparent particles and the number average particle size, as obtained in "Method for measuring the volume average particle size of the transparent particles" described above, the content of particles whose particle size was 0.9 to 1.1 times the number average particle size, and the content of particles whose particle size was 0.8 to 1.2 times the number average particle size were obtained.

<Method for Judging Whether the Number-Based Particle Size Distribution of the Transparent Particles is Substantially Trapezoid>

The content of particles whose particle size was 0.9 to 1.1 times the number average particle size, as obtained by the above measurement method, was divided by two, and the result was taken as a first value. The content of particles whose particle size was 0.8 to 1.2 times the number average particle size, obtained likewise, was divided by four, and the result was taken as a second value. If the absolute value of the difference between the first value and the second value was 1.0% by number or less, the number-based particle size distribution of such transparent particles was judged as trapezoid.

<Method for Measuring the Refractive Index of the Transparent Particles>

The refractive index of the transparent particles was measured by the Becke line test. To measure the refractive index by the Becke line test, transparent particles were placed on a glass slide, and refractive index liquids were dropped thereon (Cargille refractive index liquids, manufactured by Cargille Laboratories, in a range near an expected refractive index, for example, from 1.538 to 1.564, were kept available by 0.002 increments in refractive index). After the transparent particles and each refractive index liquid were mixed well, the profile of the transparent particles was observed from above by an optical microscope while the glass slide was irradiated from below by a high-pressure sodium lamp (model number "NX35", center wavelength 589 nm, manufactured by Iwasaki Electric Co., Ltd).

The observation by the optical microscope could be conducted without a particular problem at any magnification as far as the profile of the transparent particles was recognizable. Having said that, a magnification of about 500× would be suitable for observation of transparent particles having a particle size of 5 μm. In the above-mentioned process, if the refractive index of the refractive index liquid got closer to the refractive index of the transparent particles, it became harder to see the profile of the transparent particles. Hence, the refractive index of a refractive index liquid at which it was impossible or hardest to see the profile of the transparent particles in that refractive index liquid was deemed to be equal to the refractive index of the transparent particles. If the transparent particles in a refractive index liquid looked similar to those in another refractive index liquid, with a refractive index difference of 0.002 between the two refractive index liquids, an intermediate value between the two refractive index liquids was regarded as the refractive index of the transparent particles. For example, if the transparent particles observed in a refractive index liquid having a refractive index of 1.554 looked similar to those observed in another refractive index liquid having a refractive index of 1.556, the intermediate value of these refractive index liquids, 1.555, was regarded as the refractive index of the transparent particles. For this measurement, the test room temperature was conditioned between 23° C. and 27° C.

In following Examples and Comparative Examples, various characteristics of the light diffusers were also measured and judged, in terms of total light transmittance, degree of dispersion (D50), light diffusion property, difference between the rectilinear light transmittance at a wavelength of 460 nm and the rectilinear light transmittance at a wavelength of 580 nm, and visual judgment of a color change in a source light. The measurement/judgment methods are described below. The objects subjected to the measurement of the total light transmittance and the degree of dispersion for light diffusers obtained in following Examples and Comparative Examples were flat plate-like light diffusion covers, obtained in the same manner as following Examples and Comparative Examples, having the same thickness (1 mm or 2 mm) as the light diffusion covers obtained in following Examples and Comparative Examples and having a planar size of 50 mm × 100 mm.

<Method for Measuring the Total Light Transmittance of the Light Diffuser>

The total light transmittance of the light diffuser was measured in accordance with JIS K 7361. Specifically, the total light transmittance was measured by a haze meter "NDH4000" manufactured by Nippon Denshoku Industries Co., Ltd. The number of measurement samples was 10 (n=10), and the total light transmittance (%) of these 10 measurement samples were averaged and taken as the total light transmittance (%) of the light diffuser.

<Method for Measuring the Degree of Dispersion (D50) of the Light Diffuser>

The degree of dispersion (D50) of the light diffuser was defined as a transmission angle at which the light transmittance was 50% of the rectilinear light transmittance when light was emitted to a surface of the light diffuser in a direction normal to the surface. The degree of dispersion (D50) was obtained with use of an automatic goniophotometer ("Goniophotometer GP-200" manufactured by Murakami Color Research Laboratory Co., Ltd.) by the following procedure.

The light diffuser was placed 75 cm away from a light source of the automatic goniophotometer. Rectilinear light was emitted from the light source of the automatic goniophotometer to the light diffuser, in the direction normal to the surface of the light diffuser. The intensity of light transmitted through the light diffuser was measured by a movable photodetector, with a light-receiving angle being changed. The measured intensity was converted into a transmittance, which was plotted on a graph in relation to the light-receiving angle (transmission angle) relative to the direction normal to the surface of the light diffuser. An angle (transmission angle) at which the light transmittance (a rectilinear light transmittance; a light transmittance when the transmission angle was)0° was 50% of the light transmittance in the direction normal to the surface of the light diffuser was obtained on this graph. This angle (transmission angle) was called degree of dispersion (D50), whose unit was "degree") (°). A greater degree of dispersion (D50) means a better light diffusion property.

FIG. 1 relates to an example where the intensity of light transmitted through the light diffusion plate (the light diffuser) was measured with use of the automatic goniophotometer. In this graph, the vertical axis represents a relative value of the intensity of transmitted light, and perpendicular lines were drawn from points plotted at the intensity of 50% to obtain intersections with the horizontal axis. The horizontal axis represents a degree (°), called degree of dispersion (D50). According to the measurement result shown in FIG. 1, the degree of dispersion (D50) was 57.3°. The degree of dispersion (D50) was an arithmetic average of two absolute values on the left side and the right side of the origin 0° on the horizontal axis (absolute values of two angles at the transmitted light intensity of 50%).

<Method for Measuring the Light Diffusion Property of the Light Diffuser>

The light diffusion property of the light diffuser was obtained with use of an automatic goniophotometer ("Goniophotometer GP-200" manufactured by Murakami Color Research Laboratory Co., Ltd.) by the following procedure.

The light diffuser was placed 75 cm away from a light source of the automatic goniophotometer. Rectilinear light was emitted from the light source of the automatic goniophotometer to the light diffuser, in the direction normal to the surface of the light diffuser. The intensity of light transmitted through the light diffuser was measured by a movable photodetector, at positions where the light-receiving angles (transmission angles) to the surface of the light diffuser in the direction normal to the surface of the light diffuser were 0 and 70 degrees. The measured intensities were converted into transmittance to give the intensities of transmitted light (rectilinear light transmittances) $I_0$ and $I_{70}$ at the transmission angles of 0° and 70°, respectively. The intensity of transmitted light at the transmission angle of 70° relative to the intensity of transmitted light at the transmission angle of 0°, $I_{70}/I_0$, was taken as the light diffusion property.

<Method for Measuring the Difference Between the Rectilinear Light Transmittance at a Wavelength of 460 nm and the Rectilinear Light Transmittance at a Wavelength of 580 nm>

As a measurement sample, the light diffuser was cut into a piece having a planar size of 50 mm×25 mm. For conditioning, this measurement sample was left still for one hour or longer, in a constant temperature/humidity room at a temperature of 20° C. and a relative humidity of 65%. Later, the measurement sample was subjected to measurement of spectral luminous intensity.

The rectilinear light transmittance was measured from 300 nm to 800 nm in a constant temperature/humidity room conditioned at a temperature of 20° C. and a relative humidity of 65%, with the measurement sample being set in a UV-visible spectrophotometer (model number "UV-2450" manufactured by Shimadzu Corporation) to which an integrating sphere was not attached. As a specific procedure, a film holder (an attachment to the UV-visible spectrophotometer) was set on the UV-visible spectrophotometer at the beginning. Next, the transmittance (rectilinear light transmittance) was measured for light having wavelengths from 300 nm to 800 nm by the UV-visible spectrophotometer, and the UV-visible spectrophotometer was calibrated such that the intensity of transmitted light at 500 nm was 100%. Next, with the measurement sample being set on the film holder, the transmittance (rectilinear light transmittance) at a wavelength of 460 nm and the transmittance (rectilinear light transmittance) at a wavelength of 580 nm were measured. An absolute value (difference) obtained by subtracting the transmittance (rectilinear light transmittance) at 580 nm from the transmittance (rectilinear light transmittance) at 460 nm was taken as the difference between the rectilinear light transmittance at a wavelength of 460 nm and the rectilinear light transmittance at a wavelength of 580 nm.

For this measurement, following measurement conditions and parameters for the UV-visible spectrophotometer (device parameters) were applied.

(Measurement Conditions)
Measurement wavelength range: 300 nm to 800 nm
Scan speed: medium
Sampling pitch: 1 nm
Measurement mode: single (Device Parameters)
Photometric value: transmission
Slit width: 2.0 mm
Light source switching wavelength: 360 nm
S/R exchange: normal <Method for Visual Judgment of a Color Change in a Source Light in the Presence of the Light Diffuser>

A double-capped luminaire in which the light source was an LED light source (trade name "ECOLUX™ HE", manufactured by IRIS Ohyama Inc., color temperature: 5,000K, general color rendering index Ra: 80 or higher) was lit up. The light diffuser was installed 20 cm away from this double-capped luminaire. The color of a source light was visually judged before and after the installation of the light diffuser. In Table 1, "good" means the color of the source light (the color of light emitted from the light source, transmitted through the light diffuser, and reaching the eye) did not change even after the installation of the light diffuser, and "poor" means that the color of the source light had changed after the installation of the light diffuser, or that the color of a source light could not be identified by visual observation because the light diffuser was opaque. In the case where a color change was observed, the visually identified color of the source light was recorded (in parentheses in Table 1). In the case where the light diffuser was opaque and hampered visual identification of the color of a source light, the term "(opaque)" is filled in a corresponding cell in Table 1.

Visual judgment was conducted in the same manner except that the double-capped luminaire equipped with an LED light source was replaced by a double-capped luminaire whose light source was a fluorescent lamp (manufactured by Toshiba Lighting & Technology Corporation, trade name "WATT BRIGHTER® FLR40SW/M/36", color temperature: 4,200K, general color rendering index Ra =61).

<Visual Evaluation of the Light Diffuser, as an Image Projection Screen>

The light diffuser was evaluated for three evaluation items: image clarity through the light diffuser as a transmission-type screen (a rear projection screen), which is a type of image projection screens; image clarity through the light diffuser as a projection-type screen (a front projection screen), which is another type of image projection screens; and visual judgment of a color change in a source light of the projector.

In the evaluation of image clarity through the light diffuser as a transmission-type screen, a projection-type projector (trade name "XP3000JX" manufactured by Fuji Xerox Co., Ltd.) was employed as an image projection device, and the light diffuser was employed as a transmission-type screen. An image was projected by the projection-type projector to the light diffuser, and clarity of the image was evaluated.

In the evaluation of image clarity through the light diffuser as a projection-type screen, the light diffuser was employed as a projection-type screen. Except this change, clarity of the image was evaluated in the same manner as in the case where the light diffuser was used as a transmission-type screen.

In the visual judgment of a color change in a source light of the projector, the above-mentioned projection-type projector was employed as an image projection device, and a 260W super high pressure mercury lamp was employed as a light source of the projector. The light diffuser was positioned two meters away from the lens of the projector, horizontally to the projection surface. An evaluator saw a source light through the lens of the projector via the light diffuser, observed the color of the source light while tilting the light diffuser by 45° each in horizontal directions and vertical directions. If the color did not change at any angle, the light diffuser got a passing grade. As a comprehensive evaluation, "good" indicates that the light diffuser got passing grades in all of the above three evaluation items; "fair" indicates that the light diffuser got passing grades in two of the three evaluation items, and "poor" means that the light diffuser got one or no passing grade. In Table 1, the fair-grade light diffusers which failed in the visual judgment of a color change in a source light of the projector were given a remark "(color change: poor)".

<Method for Producing Resin Particles (A)>

Into a stainless beaker (internal volume 5L), 3,000 grams of purified water as an aqueous medium, 2.4 grams (800 parts by weight relative to 1,000,000 parts by weight of purified water) of sodium lauryl sulfate as a surfactant, and 90 grams of magnesium pyrophosphate as a dispersion stabilizer were charged to give an aqueous phase.

Into another stainless beaker which was separate from the one used for preparation of the aqueous phase, 250 grams of methyl methacrylate as a monofunctional (meth)acrylic-based monomer, 700 grams of styrene as a monofunctional styrene-based monomer, 50 grams of ethylene glycol dimethacrylate (EGDMA) as a crosslinkable monomer, 3 grams of n-dodecyl mercaptan as a chain transfer agent, 9 grams of 2,2-azobis(2,4-dimethylvaleronitrile) as a polymerization initiator, and 4 grams of Cert-butylperoxy-2-ethylhexanoate as a polymerization initiator were charged and stirred thoroughly to give an oil phase.

The thus prepared oil phase was added to the aqueous phase which had been prepared earlier. Using "T.K. homomixer" (manufactured by PRIMIX Corporation), the oil phase and the aqueous phase were stirred for five minutes at a rotation speed of 5,000 rpm to give a primary suspension. The primary suspension was allowed to pass through "Microfluidizer" (manufactured by Powrex Corporation) once, under the pressure of 200 MPa, to give a secondary suspension. The secondary suspension was charged into a reactor (volume 5L) equipped with a stirrer and a thermometer. Then, the monomer mixture (methyl methacrylate, styrene, and ethylene glycol dimethacrylate) was allowed to polymerize for five hours at 60° C., then heated at 110° C. for two hours, and cooled down to 30° C. to give slurry which contained resin particles.

Next, hydrochloric acid was added to the slurry which contained resin particles until the pH of the slurry dropped to 2 or less, so that the magnesium pyrophosphate was decomposed. The resin particle-containing slurry to which hydrochloric acid had been added was rinsed with water by means of a centrifugal dehydrator until the pH of the water after rinsing reached 6 to 7. Then, the slurry was dried to give a dehydrated cake. The dehydrated cake was dried under vacuum for 20 hours by means of a vacuum drier at a jacket temperature of 60° C. The dried dehydrated cake was sieved through a 400-mesh sieve (aperture width 0.034 mm) to give resin particles (A).

The volume average particle size of the resin particles (A) was 5.5 μm, as measured by the above-mentioned method. The CV of the resin particles (A) was 52.9%, as calculated by the above-mentioned method. The refractive index of the resin particles (A) was 1.564, as measured by the above-mentioned method. The resin particles (A) had a number average particle size of 3.7 μm. The content of particles whose particle size was in the range of 0.9 to 1.1 times (inclusive) the number average particle size (i.e. in the range of 3.3 to 4.1 μm, inclusive) was 27.8% by number. The content of particles whose particle size was in the range of 0.8 to 1.2 times (inclusive) the number average particle size (i.e. in the range of 3.0 to 4.4 μm, inclusive) was 44.1% by number.

<Method for Producing Resin Particles (B)>

Except that the amount of sodium lauryl sulfate was changed to 0.9 grams and that the amount of magnesium pyrophosphate was changed to 60 grams, resin particles (B) were obtained in the same manner as the method for producing resin particles (A) described above.

The volume average particle size of the resin particles (B) was 7.5 μm, as measured by the above-mentioned method. The CV of the resin particles (B) was 29.6%, as calculated by the above-mentioned method. The refractive index of the resin particles (B) was 1.564, as measured by the above-mentioned method. The resin particles (B) had a number average particle size of 5.7 μm. The content of particles whose particle size was in the range of 0.9 to 1.1 times (inclusive) the number average particle size (i.e. in the range of 5.1 to 6.3 μm, inclusive) was 25.5% by number. The content of particles whose particle size was in the range of 0.8 to 1.2 times (inclusive) the number average particle size (i.e. 4.6 to 6.8 μm, inclusive) was 44.4% by number.

<Method for Producing Resin Particles (C)>

Except that the amount of sodium lauryl sulfate was changed to 0.6 grams and that the amount of magnesium pyrophosphate was changed to 60 grams, resin particles (C) were obtained in the same manner as the method for producing resin particles (A) described above.

The volume average particle size of the resin particles (C) was 11.3 μm, as measured by the above-mentioned method. The CV of the resin particles (C) was 23.9%, as calculated by the above-mentioned method. The refractive index of the resin particles (C) was 1.564, as measured by the above-mentioned method. The resin particles (C) had a number average particle size of 8.3 μm. The content of particles whose particle size was in the range of 0.9 to 1.1 times (inclusive) the number average particle size (i.e. in the range of 7.5 to 9.1 μm, inclusive) was 14.8% by number. The content of particles whose particle size was in the range from 0.8 to 1.2 times (inclusive) the number average particle size (i.e. in the range of 6.6 to 10.0 μm, inclusive) was 34.5% by number.

<Method for Producing Resin Particles (D)>

Except that the stirring with use of "T.K. homomixer" was conducted for 15 minutes at a rotation speed of 8,000 rpm, and that the primary suspension liquid was employed in the polymerization without the secondary suspension preparation treatment with use of "Microfluidizer", resin particles (D) were obtained in the same manner as "Method for producing resin particles (A)" described above.

The volume average particle size of the resin particles (D) was 5.5 μm, as measured by the above-mentioned method. The CV of the resin particles (D) was 33.2%, as calculated by the above-mentioned method. The refractive index of the resin particles (D) was 1.564, as measured by the above-mentioned method. The resin particles (D) had a number average particle size of 3.3 μm. The content of particles whose particle size was in the range of 0.9 to 1.1 times (inclusive) the number average particle size (i.e. in the range of 3.0 to 3.6 μm, inclusive) was 13.0% by number. The content of particles whose particle size was in the range of 0.8 to 1.2 times (inclusive) the number average particle size (i.e. in the range of 2.6 to 4.0 μm, inclusive) was 30.2% by number.

Example 1

As transparent particles, mixed resin particles were obtained by mixing 0.09 parts by weight of the resin particles (A) (refractive index 1.564), 0.2 parts by weight of the resin particles (B) (refractive index 1.564), 0.71 parts by weight of the resin particles (C) (refractive index 1.564), obtained by the above production methods. The volume average particle size of the mixed resin particles was 10.2 µm, as measured by the above-mentioned method. The CV of the mixed resin particles was 33.7%, as calculated by the above-mentioned method. The mixed resin particles had a number average particle size of 5.8 µm. The content of particles whose particle size was in the range of 0.9 to 1.1 times (inclusive) the number average particle size (i.e. in the range of 5.2 to 6.4 µm, inclusive) was 13.5% by number. The content of particles whose particle size was in the range of 0.8 to 1.2 times (inclusive) the number average particle size (i.e. in the range of 4.6 to 7.0 µm, inclusive) was 27.0% by number.

Using a Henschel mixer, 1.0 part by weight of the mixed resin particles and 100 parts by weight of acrylic-based resin (trade name "SUMIPEX® EX" manufactured by Sumitomo Chemical Company, Limited, refractive index 1.49) as a thermoplastic resin were mixed for 15 minutes to give a mixture. Using a single screw extruder (model number "R50" manufactured by Hoshi Plastic), the mixture was extruded at a temperature of 210 to 260° C. at an extrusion rate of 10 to 25 kg/h. The extruded product was cooled with water and cut by a pelletizer to give pellets of a light-diffusing resin composition.

The pellets of the light-diffusing resin composition were predried at 105° C. for five hours to remove the moisture sufficiently, and the dried pellets were injection molded at a temperature of 240° C. by an injection molding machine (model number "FNX140" manufactured by NISSEI PLASTIC INDUSTRIAL CO., LTD.) equipped with a mold with a cavity thickness of 1 mm. Thus produced was a light diffusion plate (a type of light diffuser), applicable to each of a light diffusion cover and an image projection screen, containing about 1.0% by weight of the mixed resin particles, and having a flat plate-like shape with a thickness of 1 mm and a planar size of 50 mm×50 mm.

Example 2

Except that the amount of the mixed particles was changed to 0.5 parts by weight, a light diffusion plate (a type of light diffuser) was produced in the same manner as in Example 1. The thus obtained light diffusion plate was applicable to each of a light diffusion cover and an image projection screen, and had a flat plate-like shape with a thickness of 1 mm and a planar size of 50 mm×50 mm.

Example 3

Except that the cavity thickness of the mold mounted on the injection molding machine was changed to 2 mm, a light diffusion plate (a type of light diffuser) was produced in the same manner as in Example 2. The thus obtained light diffusion plate was applicable to each of a light diffusion cover and an image projection screen, and had a flat plate-like shape with a thickness of 2 mm and a planar size of 50 mm×50 mm.

Comparative Example 1

Except that 1.0 part by weight of the mixed resin particles, as the transparent particles, was replaced by 1.0 part by weight of the resin particles (A), a light diffusion plate (a type of light diffuser) was produced in the same manner as in Example 1. The thus obtained light diffusion plate was applicable to each of a light diffusion cover and an image projection screen.

Comparative Example 2

Except that 0.5 parts by weight of the mixed resin particles, as the transparent particles, were replaced by 0.5 parts by weight of the resin particles (B), a light diffusion plate (a type of light diffuser) was produced in the same manner as in Example 2. The thus obtained light diffusion plate was applicable to each of a light diffusion cover and an image projection screen.

Comparative Example 3

Except that 1.0 part by weight of the mixed resin particles, as the transparent particles, was replaced by 1.0 part by weight of the resin particles (B), a light diffusion plate (a type of light diffuser) was produced in the same manner as in Example 1. The thus obtained light diffusion plate was applicable to each of a light diffusion cover and an image projection screen.

Comparative Example 4

Except that 1.0 part by weight of the mixed resin particles, as the transparent particles, was replaced by 1.0 part by weight of the resin particles (D), a light diffusion plate (a type of light diffuser) was produced in the same manner as in Example 1. The thus obtained light diffusion plate was applicable to each of a light diffusion cover and an image projection screen.

Comparative Example 5

A light diffusion plate was produced in accordance with Example 5 in PTL 1. Namely, 100 parts by weight of methacrylic resin beads (trade name "SUMIPEX® EXA" manufactured by Sumitomo Chemical Company, Limited, refractive index 1.49) as a thermoplastic resin, 2.0 parts by weight of crosslinked silicon resin particles (EP-2720, manufactured by Dow Corning Toray Co., Ltd., average particle size 2 µm, refractive index 1.42) as transparent particles, 10 ppm of ultramarine (model number "Nast Blue 8520" manufactured by ARIMOTO CHEMICAL Co., Ltd.) as a blue pigment were mixed by means of a Henschel mixer to give a mixture. Using a single screw extruder (model number "R50" manufactured by Hoshi Plastic), the mixture was extruded at a temperature of 210 to 260° C. at an extrusion rate of 10 to 25 kg/h. The extruded product was cooled with water and cut by a pelletizer to give pellets of a light-diffusing resin composition.

The pellets of the light-diffusing resin composition were predried at 105° C. for five hours to remove the moisture sufficiently, and the dried pellets were injection molded at a temperature of 240° C. by an injection molding machine (model number "FNX140" manufactured by NISSEI PLASTIC INDUSTRIAL CO., LTD.) equipped with a mold with a cavity thickness of 2 mm. Thus produced was a light diffusion plate (a type of light diffuser), applicable to each of a light diffusion cover and an image projection screen, containing about 2.0% by weight of the mixed resin particles, and having a flat plate-like shape with a thickness of 2 mm and a planar size of 50 mm×50 mm.

The light diffusers (light diffusion plates applicable to each of a light diffusion cover and an image projection screen) obtained in these Examples and Comparative Examples were subjected to evaluation of optical characteristics (measurements of total light transmittance, degree of dispersion (D50), light diffusion property, and difference between the rectilinear light transmittance at a wavelength of 460 nm and the rectilinear light transmittance at a average particle size, CV, number average particle size, content of particles whose particle size is 0.9 to 1.1 times the number average particle size, content of particles whose particle size is 0.8 to 1.2 times the number average particle size, and result of judgment as to whether the number-based particle size distribution was substantially trapezoid.

TABLE 1

| | Transparent particles | | | | | | |
|---|---|---|---|---|---|---|---|
| | Refractive index | Volume average particle size (μm) | CV (%) | Number average particle size (μm) | Content of particles whose particle size is 0.9 to 1.1 times the number average particle size (% by number) | Content of particles whose particle size is 0.8 to 1.2 times the number average particle size (% by number) | Number-based particle distribution, substantially trapezoidal or not |
| Example 1 | 1.564 | 10.2 | 33.7 | 5.8 | 13.5 | 27.0 | substantially trapezoidal |
| Example 2 | 1.564 | 10.2 | 33.7 | 5.8 | 13.5 | 27.0 | substantially trapezoidal |
| Example 3 | 1.564 | 10.2 | 33.7 | 5.8 | 13.5 | 27.0 | substantially trapezoidal |
| Comparative Example 1 | 1.564 | 5.5 | 52.9 | 3.7 | 27.8 | 44.1 | not substantially trapezoidal |
| Comparative Example 2 | 1.564 | 7.5 | 29.6 | 5.7 | 25.5 | 44.4 | not substantially trapezoidal |
| Comparative Example 3 | 1.564 | 7.5 | 29.6 | 5.7 | 25.5 | 44.4 | not substantially trapezoidal |
| Comparative Example 4 | 1.564 | 5.5 | 33.2 | 3.3 | 13.0 | 30.2 | not substantially trapezoidal |
| Comparative Example 5 | 1.420 | 2.0 | — | — | — | — | not substantially trapezoidal |

| | Light diffusers | | | | | | |
|---|---|---|---|---|---|---|---|
| | | | Difference between rectilinear light transmittances | Light | Degree of | Visual judgment of a color change in a source light | Visual evaluation |
| | Thickness (mm) | Total light transmittance (%) | at 460 nm and 580 nm (%) | diffusion property | dispersion (D50) (°) | LED / fluorescent light | as an image projection screen |
| Example 1 | 1 | 95.3 | 0.95 | 0.00 | 5.8 | good / good | good |
| Example 2 | 1 | 94.5 | 0.51 | 0.00 | 2.1 | good / good | good |
| Example 3 | 2 | 94.6 | 0.30 | 0.00 | 2.8 | good / good | good |
| Comparative Example 1 | 1 | 95.4 | 1.41 | 0.02 | 11.5 | poor (red) / poor (red) | fair (color change: poor) |
| Comparative Example 2 | 1 | 95.2 | 1.41 | 0.00 | 2.7 | poor (blue) / poor (blue) | fair (color change: poor) |
| Comparative Example 3 | 1 | 95.6 | 0.97 | 0.00 | 7.8 | poor (blue) / poor (blue) | fair (color change: poor) |
| Comparative Example 4 | 1 | 96.0 | 1.66 | 0.00 | 8.9 | poor (red) / poor (red) | fair (color change: poor) |
| Comparative Example 5 | 2 | 59.0 | — | 0.27 | — | poor (opaque) / poor (opaque) | poor | wavelength of 580 nm), visual judgment of a color change in a source light, and visual evaluation as an image projection screen.

Table 1 shows the values of the various measurements, the judgment results, and the evaluation results of the light diffusers obtained in these Examples and Comparative Examples, along with the values of the various measurements and the judgment results of the transparent particles employed in these Examples and Comparative Examples. Regarding the light diffusers, Table 1 shows thickness, total light transmittance, difference between the rectilinear light transmittance at a wavelength of 460 nm and the rectilinear light transmittance at a wavelength of 580 nm, light diffusion property, degree of dispersion (D50), results of visual judgment of a color change in a source light, results of visual evaluation as an image projection screen. Regarding the transparent particles, Table 1 shows refractive index, volume As above, the difference between the rectilinear light transmittance at a wavelength of 460 nm and the rectilinear light transmittance at a wavelength of 580 nm was 0.96% or less (specifically, 0.30 to 0.95%) in the light diffusers obtained in Examples 1 to 3, but was higher than 0.96% (specifically, 0.97 to 1.66%) in the light diffusers obtained in Comparative Examples 1 to 4. In comparison with the light diffusers obtained in Comparative Examples 1 to 4, the light diffusers obtained in Examples 1 to 3 showed smaller color changes of a source light when these light diffusers were disposed on an optical path of a light source, and showed better results in the visual evaluation as an image projection screen. Besides, compared with the light diffuser obtained in Comparative Example 5, the light diffusers obtained in Examples 1 to 3 showed remarkably higher total light transmittances, had better light transmission properties, and showed better results in the visual judgment of a color change in a source light and in the visual evaluation as an image projection screen.

The invention claimed is:

1. A light diffuser which comprises a thermoplastic resin and transparent particles added thereto,
   a total light transmittance of the light diffuser being 75% or more,
   a degree of dispersion of the light diffuser being 2° or more, wherein the degree of dispersion is defined as a transmission angle at which a light transmittance is 50% of a rectilinear light transmittance when light is emitted to a surface of the light diffuser in a direction normal to the surface, and
   a difference between a rectilinear light transmittance at a wavelength of 460 nm and a rectilinear light transmittance at a wavelength of 580 nm of the light diffuser being 0.96% or less,
   wherein a number average particle size of the transparent particles is in a range of 1 to 20 μm, and
   wherein, provided that a content of particles whose particle size is 0.9 to 1.1 times the number average particle size of the transparent particles is divided by two, a result of which is taken as a first value, and that a content of particles whose particle size is 0.8 to 1.2 times the number average particle size of the transparent particles is divided by four, a result of which is taken as a second value, an absolute value of a difference between the first value and the second value is 1.0% by number or less.

2. The light diffuser according to claim 1, wherein a volume average particle size of the transparent particles is in a range of 1 to 20 μm.

3. The light diffuser according to claim 1, wherein an amount of the transparent particles is in a range of 0.5 to 2.0% by weight.

4. A lighting cover which is a molded product of the light diffuser according to claim 1.

5. The lighting cover according to claim 4, which is used for a lighting apparatus for color evaluation.

6. An image projection screen which is a molded product of the light diffuser according to claim 1.

7. A semi-transparent building material which is a molded product of the light diffuser according to claim 1.

* * * * *